United States Patent [19]

Hattori et al.

[11] Patent Number: 4,466,521
[45] Date of Patent: Aug. 21, 1984

[54] ELECTRIC CONTROL SYSTEM FOR AUTOMOBILE TRANSMISSION

[75] Inventors: Yoshiyuki Hattori, Toyoake; Kazuma Matsui, Toyohashi; Toshihiro Takei, Kariya; Hideyuki Hayakawa, Nishio; Takahiro Goshima, Kariya, all of Japan

[73] Assignee: Nippondenso Co., Ltd., Kariya, Japan

[21] Appl. No.: 324,573

[22] Filed: Nov. 24, 1981

[30] Foreign Application Priority Data

Nov. 27, 1980 [JP] Japan .................. 55-167215

[51] Int. Cl.³ ............................. B60K 41/28
[52] U.S. Cl. ....................... 192/0.032; 192/0.052; 192/0.076; 192/0.092; 74/866
[58] Field of Search ............... 192/0.032, 0.033, 0.034, 192/0.052, 0.07, 0.075, 0.076, 0.092, 3.56, 3.58, 21.5; 74/866; 474/12

[56] References Cited

U.S. PATENT DOCUMENTS

| | | | |
|---|---|---|---|
| 4,161,894 | 7/1979 | Giacosa | 74/863 |
| 4,228,691 | 10/1980 | Smirl | 474/12 |
| 4,282,947 | 8/1981 | Kemper | 192/0.033 |
| 4,314,340 | 2/1982 | Miki et al. | 74/866 |

Primary Examiner—George H. Krizmanich
Assistant Examiner—M. Mauley
Attorney, Agent, or Firm—Cushman, Darby & Cushman

[57] ABSTRACT

An electric control system for an automobile transmission includes an endless transmission member running on a pair of V-shaped pulley units, the mutual distances of the conical sheaves of which are hydraulically adjustable to transmit an output torque of an engine to a driven apparatus. The electric control system is arranged to determine an optimum fluid pressure in relation to the actual output torque of the engine and to determine an optimum transmission ratio for low fuel consumption in relation to the actual output power of the engine. The control system produces a first electric control signal indicative of the difference between the optimum fluid pressure and the actual fluid pressure in one of actuators for the respective pulley units and produces a second electric control signal indicative of the difference between the optimum and actual transmission ratios. The pressure of fluid applied to one of the actuators is controlled in response to the first electric control signal, and the flow quantity of fluid applied to the other actuator is controlled in response to the second electric control signal.

6 Claims, 3 Drawing Figures

ELECTRIC CONTROL SYSTEM FOR AUTOMOBILE TRANSMISSION

BACKGROUND OF THE INVENTION

The present invention relates to automobile transmissions, and more particularly to an electric control system for an automobile transmission of the type including an endless transmission member in the form of a V-shaped belt running on a pair of V-shaped pulley units, the mutual distances of the conical sheaves of which are hydraulically adjustable to transmit an output torque of an internal combustion engine to a driven apparatus with an infinitely variable transmission ratio.

SUMMARY OF THE INVENTION

The primary object of the present invention is to provide an improved electric control system for an automobile transmission capable of reliably transmitting the output torque of the engine to the driven apparatus with an optimum transmission ratio for low fuel consumption in accordance with travel condition of the vehicle.

A further object of the present invention is to provide an improved electric control system for an automobile transmission capable of controlling energization of an electromagnetic powder clutch assembled with the transmission in accordance with rotational speed of the engine.

ccording to the present invention there is provided an electric control system for an automobile transmission which comprises a driving pulley unit of the V-shaped type provided with a drive shaft drivingly connected to an output shaft of an internal combustion engine for a vehicle and with a pair of facing, conical sheaves, assembled for rotation about the drive shaft, a driven pulley unit of the V-shaped type provided with a driven shaft and a pair of facing, conical sheaves, assembled for rotation about the driven shaft, an endless transmission member wound around the pulley units for transmitting an output torque from the engine to the driven shaft with an infinitely variable transmission ratio under control of each mutual distance of the conical sheaves of the respective pulley units, and first and second actuators associated with each of the pulley units for adjusting the distance between the respective conical sheaves thereof under control of fluid under pressure applied thereto. The electric control system is characterized by provision of means for determining an optimum fluid pressure in relation to the actual output torque of the engine and the actual transmission ratio between the pulley units, means for determining an optimum rotational speed of the engine for low fuel consumption in relation to the actual output power of the engine and determining an optimum transmission ratio related to the optimum rotational speed of the engine, means for producing a first electric control signal indicative of the difference between the optimum fluid pressure and the actual fluid pressure in one of the actuators and producing a second electric control signal indicative of the difference between the optimum transmission ratio and the actual transmission ratio, and an electrically operated fluid control means responsive to the first and second electric control signals to control the pressure of fluid applied to one of the actuators and to control the flow quantity of fluid applied to the other actuator.

In a preferred embodiment of the present invention, it is desirable that an electromagnetic powder clutch is adapted to drivingly connect the output shaft of the engine to the drive shaft of the driving pulley unit in response to the actual rotational speed of the engine to effect the infinitely variable torque transmission between the drive and driven shafts.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
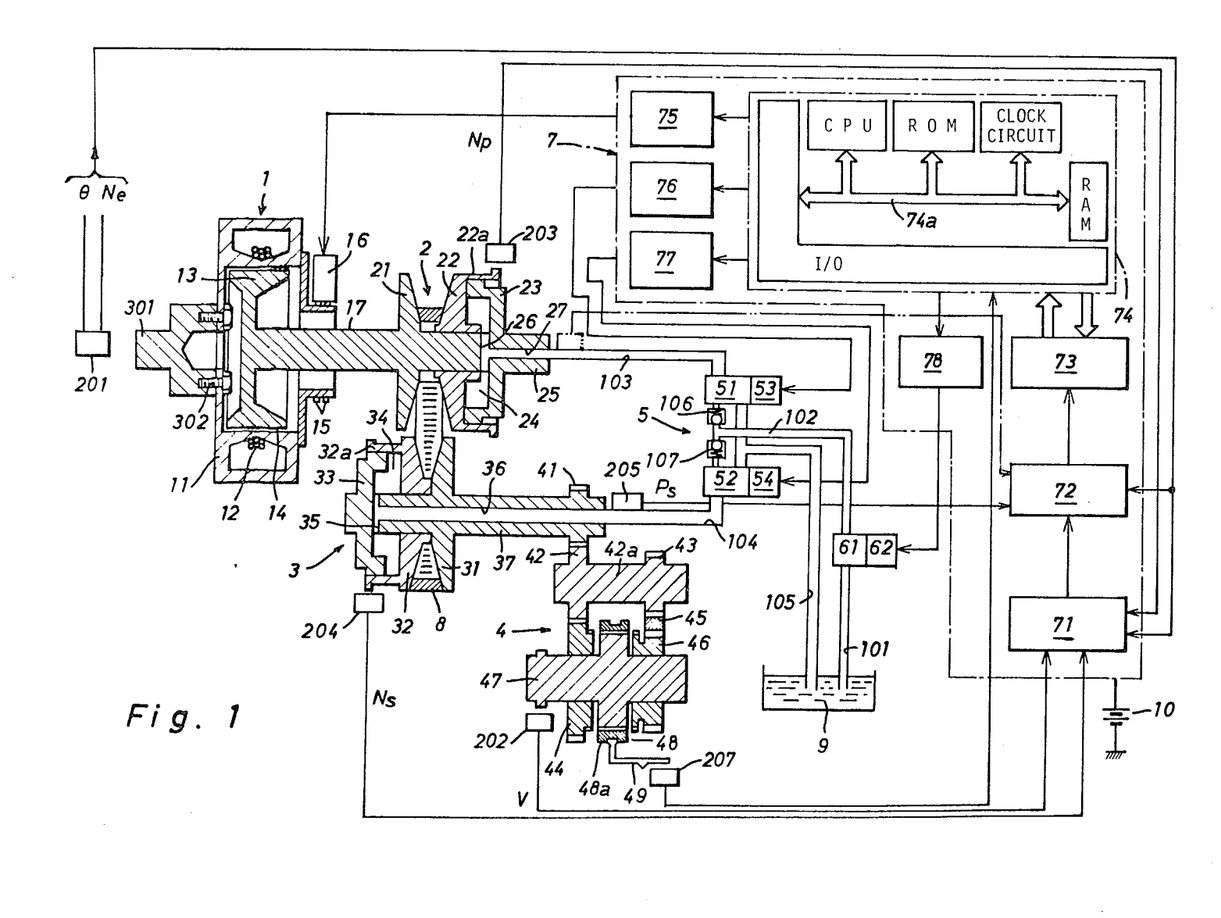
FIG. 1 schematically illustrates the whole construction of a preferred embodiment in accordance with the present invention adapted to an automotive vehicle.

Referring now to FIG. 1 of the drawings, there is schematically illustrated a block diagram of a preferred embodiment in accordance with the present invention which is adapted to an automotive vehicle. A driving pulley unit 2 is coupled by an electromagnetic clutch mechanism 1 to an internal combustion engine for the automotive vehicle. The electromagnetic clutch mechanism 1 is in the form of a magnetic powder clutch which includes an annular driving member 11 and a driven member 13 respectively made of magnetic material. The driving member 11 is provided therein with an electromagnetic coil 12 and is coupled to a crankshaft 301 of the engine by a fastening bolt 302. The driven member 13 is formed integral with a clutch shaft 17 of powder clutch 1 and is arranged concentrically with the driving member 11 to form an annular air gap 14 wherein magnetic bonding material in the form of magnetic powder is located. The electromagnetic coil 12 is connected to an electric control apparatus 7 through appropriate connections including wires, slip rings 15 fixed on a boss of driving member 11, and a brush holder 16. When an electric current (i) is applied to the coil 12 through the appropriate connections from the control apparatus 7, the coil 12 is energized to produce magnetic flux in response to which the magnetic powder is magnetized to provide a bond between the driving and driven members 11 and 13 so as to transfer an output torque (T) from the engine to the pulley unit 2. In the embodiment, the degree of the output torque transfer from the engine to the pulley unit 2 is defined on a basis of torque transfer characteristics of the powder clutch 1 in which a transfer torque from the driving member 11 to the driven member 13 increases in dependence upon increase of the electric current (i) flowing through the coil 12.

The driving pulley unit 2 is coupled at its pulley shaft 25 to the clutch shaft 17 of powder clutch 1 and includes a conical sheave 21 and a piston 23 which are respectively formed integral with the pulley shaft 25. The pulley unit 2 also includes a conical sheave 22 which faces to the conical sheave 21 and is movable axially on the pulley shaft 25. The conical sheave 22 is formed integral with a hydraulic cylinder 22a which is arranged in surrounding relationship with the piston 23 to provide a fluid chamber 24. The pulley shaft 25 is provided therein with a radial passage 26 opening into the fluid chamber 24 and with a longitudinal passage 27 in communication with the radial passage 26. An endless transmission belt 8 of trapezoidal cross-section is in the form of a V-belt which has a predetermined length and is guided over the driving pulley unit 2 and a driven pulley unit 3. The driven pulley unit 3 includes a conical sheave 31 and a piston 33 which are respectively formed integral with a pulley shaft 37. The driven pulley unit 3 also includes a conical sheave 32 which faces to the conical sheave 31 and is movable axially on the pulley shaft 37. The conical sheave 32 is formed integral with a hydraulic cylinder 32a which is arranged in surrounding relationship with the piston 33 to provide a fluid chamber 34. The pulley shaft 37 is provided therein with a radial passage 35 opening into the fluid chamber 34 and with a longitudinal passage 36 in communication with the radial passage 35. The V-belt 8 runs over the conical surfaces of sheaves 21 and 22 of pulley unit 2 with a diameter defined by movement of the sheave 22 and also over the conical surfaces of sheaves 31 and 32 of pulley unit 3 with a diameter defined by movement of the sheave 32. This means that the V-belt 8 serves to adjust a transmission ratio between the pulley shafts 25 and 37 in relation to the movements of the sheaves 22 and 32.

A gear unit 4 includes an input gear 41 which is formed integral with the pulley shaft 37 and meshed with a gear 42 provided on a counter shaft 42a. The counter shaft 42a is also provided thereon with a gear 43 which is in mesh with an idler gear 45. The gears 42 and 45 are meshed respectively with forward and reverse gears 44 and 46 which are rotatable on an output shaft 47. A synchronizer 48 is provided on the output shaft 47 and includes an annular sleeve 48a which is linked with a manual shift lever 49. The manual shift lever 49 is held in the neutral position to maintain disengagement of the sleeve 48a from the forward and reverse gears 44 and 46. The manual shift lever 49 is shifted to the forward postion to mesh the sleeve 48a with the forward gear 44 in such a manner to complete forward drive gear train. The shift lever 49 is also shifted to the reverse position to mesh the sleeve 48a with the reverse gear 46 in such a manner to complete reverse drive gear train.

An electrically operated fluid control mechanism 5 is connected between conduits 103 and 104 which are respectively in communication with the longitudinal passages 27 and 36 of pulley shafts 25 and 37. The fluid control mechanism 5 comprises flow and pressure control valves 51 and 52 which are coupled to servomotors 53 and 54 respectively. The flow control valve 51 has a housing which is connected at its inlet port to a fluid pump 61 through a conduit 102. The housing of control valve 51 is connected at its outlet port to the conduit 103 and also at its drain port to a reservoir 9 through a drain conduit 105. The fluid pump 61 is coupled to an electric motor 62 and connected to the reservoir 9 through a conduit 101 to pump fluid from the reservoir 9 under control of motor 62 so as to generate fluid of line pressure in the conduit 102. The flow control valve 51 also has a spool which is axially movable within the housing under control of servomotor 53 to adjust an opening degree of control valve 51 such that the quantity of fluid through the conduit 102 from pump 61 is controlled in a desired flow quantity to be applied to the fluid chamber 24 through the conduit 103 and passages 27, 26. The servomotor 53 includes an electric pulse motor which is cooperable with a rack-and-pinion to conduct the axial movement of the spool within the housing of control valve 51. A flow divider valve 106 is disposed within the conduit 102 to permit the flow of fluid from the pump 61 to the control valve 51 through the conduit 102 and to block the flow of fluid from the control valve 51 to the pump 61 through the conduit 102.

The pressure control valve 52 has a housing which is connected at its inlet port to the pump 61 through the conduit 102. The housing of control valve 52 is connected at its outlet port to the conduit 104 and also connected at its drain port to the reservoir 9 through the drain conduit 105. The pressure control valve 52 also has a spool which is axially movable within the housing under control of servomotor 54 to adjust an opening degree of control valve 52 such that the line pressure of fluid through the conduit 102 from pump 61 is controlled in a desired fluid pressure to be applied to the pressure chamber 34 through the conduit 104 and passages 36, 35. The servomotor 54 includes an electric pulse motor which is cooperable with a rack-and-pinion to conduct the axial movement of the spool within the housing of control valve 52. Another flow divider valve 107 is disposed within the conduit 102 to permit the flow of fluid from the pump 61 to the control valve 52 through the conduit 102 and to block the flow of fluid from the control valve 52 to the pump 61 through the conduit 102.

The electric control apparatus 7 is provided with a frequency-to-voltage or F-V converter 71 connected to an engine sensor 201 and speed sensors 202, 203, 204 and with a multiplexer 72 connected to the engine sensor 201 and a pressure sensor 205. The engine sensor 201 includes speed and throttle position sensors which detect the actual rotational speed (Ne) of the crankshaft 301 and the actual opening angle ($\theta$) of a throttle valve of the engine respectively to produce a speed signal with a frequency proportional to the actual rotational speed (Ne) and an analog signal indicative of the actual throttle opening angle ($\theta$). The engine sensor 201 also includes the other sensors which detect a rotational angle of the crankshaft 301, temperature of coolant in an engine coolant system, temperature and concentration of exhaust gases for an exhaust gas recirculation system of the engine, and the like. The speed sensor 202 detects the actual rotational speed of the output shaft 47 of gear unit 4 to produce a speed signal with a frequency proportional to the actual travelling speed (V) of the automotive vehicle. The speed sensors 203 and 204 detect the actual rotational speeds (Np) and (Ns) of the pulley shafts 25 and 37 to produce speed signals with frequencies proportional to the actual rotational speeds (Np) and (Ns) respectively. The pressure sensor 205 detects the actual fluid pressure within the conduit 104 to produce an analog signal indicative of the actual fluid pressure (Ps) within the pressure chamber 34. The F-V converter 71 serves to convert the frequency of the speed signal from sensor 202 into an analog voltage indicative of the actual travelling speed (V) of the vehicle. The F-V converter 71 also serves to convert the frequencies of the speed signals from sensors 201, 203, 204 into analog voltages indicative of the actual rotational speeds (Ne), (Np), (Ns) of the crankshaft 301 and pulley shafts 25, 37 respectively. The analog voltages from converter 71 and analog signals from sensors 201, 205 are selectively applied by the multiplexer 72 to an analog-to-digital or A-D converter 73 in sequence.

The electric control apparatus 7 also includes a microcomputer 74 which is connected to the A-D converter 73 and a displacement sensor 207. The displacement sensor 207 is in the form of a differential transformer which detects the forward or reverse position of the manual shift lever 49 to produce a pulse signal indicative of the forward or reverse position of the lever 49. The displacement sensor 207 does not produce any pulse signal when the shift lever 49 is held in the neutral position. The analog signals and analog voltages from multiplexer 72 are converted by the A-D converter 73 into digital signals in sequence. The microcomputer 74 comprises a central processing unit or CPU which is connected through a bus line 74a to an input-output device or I/O, a read only memory or ROM, a random access memory or RAM and a clock circuit. I/O receives selectively the pulse signal from sensor 207 and the digital signals from A-D converter 73 upon request of CPU to temporarily store the same in RAM. The clock circuit of microcomputer 74 is cooperable with a crystal oscillator (not shown) to produce a series of clock signals. ROM serves to previously store therein a computer program which includes a main control program to be executed by CPU in accordance with a flow diagram shown in FIG. 2. CPU is responsive to a series of the clock signals from the clock circuit of microcomputer 74 to repetitively execute the computer program, especially the main control program in accordance with the flow diagram of FIG. 2. During the repetitive execution, CPU performs various operational processings, as described later, in such a manner to produce first to fourth output signals. In the embodiment, the first output signal is applied to a motor drive circuit 78 as a signal necessary for the electric motor 62, and the second output signal is applied to a clutch drive circuit 75 as a signal necessary for the powder clutch 1. The third output signal is applied to a motor drive circuit 77 as a signal necessary for the servomotor 54, and the fourth output signal is also applied to a motor drive circuit 76 as a signal necessary for the servomotor 53.

The motor drive circuit 78 includes a switching circuit which is responsive to the first output signal from the microcomputer 74 in such a manner to produce a motor drive signal. The motor drive signal from the switching circuit is amplified by an amplifier of drive circuit 78 and applied to the electric motor 62. The clutch drive circuit 75 includes a digital-to-analog or D-A converter which serves to convert the second output signal from the microcomputer 74 into an analog signal. The clutch drive circuit 75 also includes a current control circuit which is responsive to the analog signal from the D-A converter to produce a clutch drive signal to be applied to the coil 12 of powder clutch 1. The motor drive circuit 76 is responsive to the fourth output signal from the microcomputer 74 to produce a motor drive signal to be applied to the servomotor 53. The motor drive circuit 77 is responsive to the third output signal from the microcomputer 74 to produce a motor drive signal to be applied to the servomotor 54. In addition, the reference numeral 10 indicates a battery for the vehicle.

Figure 2:
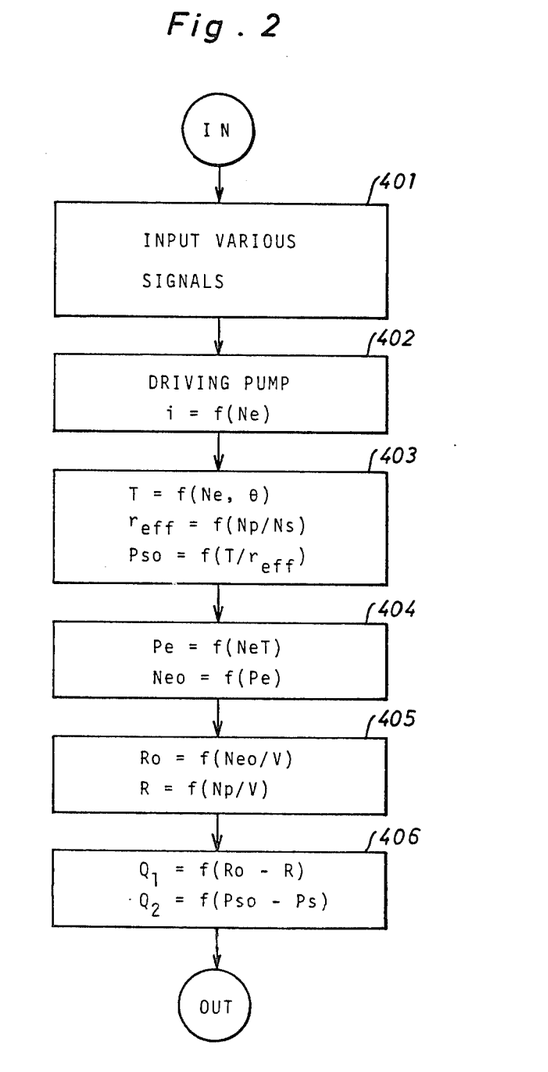
FIG. 2 is a flow diagram illustrating the operation of the microcomputer shown in block form in FIG. 1.

In operation, when idling operation of the engine is completed with the shift lever 49 maintained at the neutral position and the electric control apparatus 7 is ready for operation upon receipt of electric power supply from the vehicle battery 10, CPU of microcomputer 74 starts to execute the computer program which includes the main control program corresponding to the flow diagram of FIG. 2. At this stage, the powder clutch 1, servomotors 53, 54 and electric motor 62 are maintained respectively inoperative because CPU may not yet produce any output signals due to the neutral position of shift lever 49.

When the accelerator pedal of the vehicle is depressed and the manual shift lever 49 is shifted to the forward or reverse position, the sleeve 48a of synchronizer 48 is displaced to mesh with the forward or reverse gear 44 or 46 in such a manner to complete the forward or reverse drive gear train. When the computer program proceeds to a step 401 of the main control program in accordance with the flow diagram of FIG. 2, a pulse signal appearing from the displacement sensor 207 based on the forward or reverse position of shift lever 49 is temporarily stored by CPU in RAM. A speed signal appearing from the engine sensor 201 responsive to the idling operation of the engine is converted in frequency by the F-V converter 71 into an analog voltage indicative of the actual rotational speed (Ne), and speed signals appearing from the speed sensors 202, 203, 204 based on stationary conditions of the output and pulley shafts 47, 25, 37 are also converted in frequency by the F-V converter 71 into analog voltages indicative of the actual vehicle speed (V=0) and the actual rotational speeds (Np=0), (Ns=0) respectively. The analog voltages from F-V converter 71 are selectively applied by the multiplexer 72 to the A-D converter 73. An analog signal indicative of the actual fluid pressure (Ps=0) appearing from the pressure sensor 205 and an analog signal indicative of the actual throttle opening angle ($\theta$) appearing from engine sensor 201 responsive to the actual depression of the accelerator pedal are also selectively applied by the multiplexer 72 to the A-D converter 73. The analog voltages and signals from the multiplexer 72 are converted by the A-D converter 73 into digital signals respectively and stored in RAM upon request of CPU.

When the main control program proceeds to a step 402, CPU is responsive to the pulse signal indicative of the forward or reverse position of shift lever 49 from RAM to generate a first output signal which is applied to the motor drive circuit 78. Then, the motor drive circuit 78 is responsive to the first output signal from CPU to produce a motor drive signal which serves to rotate the electric motor 62. Thus, the fluid pump 61 is driven by the motor 62 to produce fluid of line pressure in the conduit 102 on a basis of fluid through the conduit 101 from the reservoir 9. After generation of the first output signal, CPU serves to calculate an electric current (i) from a function i=f(Ne) in dependence upon the actual rotational speed (Ne) read out from RAM. In the embodiment, the function i=f(Ne) is experimentally determined in relation to the performance of the engine and the torque transfer characteristics of powder clutch 1, as in the following, and is previously stored in ROM.

$$i = f(Ne) = \frac{i_m Ne}{N_T - N_{idle}} - \frac{i_m + N_{idle}}{N_T - N_{idle}} \quad (Ne \leq N_T)$$

$$= i_m (Ne > N_T)$$

where $N_{idle}$ indicates an idling rotational speed of the engine, where $N_T$ indicates, for example, 2000 r.p.m. of the engine for selecting i=f(Ne) in relation to Ne$\leq$N$_T$ or $Ne > N_T$, and where $i_m$ indicates the maximum electric current which is applied to the coil 12 to define a transfer torque of powder clutch 1 larger slightly than the maximum output torque of the engine.

Upon completing the calculation of the electric current (i), CPU serves to produce a second output signal indicative of the calculated electric current (i) which is applied to the clutch drive circuit 75. Then, the clutch drive circuit 75 is responsive to the second output signal from CPU to produce a clutch drive signal indicative of the calculated current (i) which is applied to the coil 12 of powder clutch 1 through the appropriate connections. Subsequently, the coil 12 is energized due to the clutch drive signal from drive circuit 75 to produce magnetic flux in response to which the magnetic powder in the air gap 14 is magnetized to couple the driven member 13 to the driving member 11 in a slipping manner. Thus, an output torque from the engine is transmitted by the powder clutch 1 to the driving pulley unit 2 as a transfer torque which is defined by the torque transfer characteristics of powder clutch 1 relative to the calculated current (i) of the clutch drive signal. This means that rotational speed of pulley unit 2 is gradually increased due to the torque transfer characteristics of powder clutch 1.

When the main control program proceeds to a step 406 through steps 403 to 405, CPU is responsive to the pulse signal indicative of the forward or reverse position of shift lever 49 from RAM to produce as a third output signal an initial fluid pressure which is previously stored in ROM. In the embodiment, the initial fluid pressure is determined such that the initial volume of the fluid chamber 34 is adjusted to maintain an effective radius of V-belt 8 in the maximum value around the sheaves 31, 32 of pulley unit 3. When the third output signal from CPU is applied to the motor drive circuit 77, a motor drive signal indicative of the initial fluid pressure is produced from the drive circuit 77 and applied to the servomotor 54 of fluid control mechanism 5. Then, the pressure control valve 52 is opened under control of the servomotor 54 to control the line pressure of fluid from pump 61 in the initial fluid pressure which is applied to the fluid chamber 34 through the conduit 104 and passages 36, 35. Subsequently, the conical sheave 32 of pulley unit 3 is moved due to the initial fluid pressure within the chamber 34 to maintain in the maximum value the effective radius of V-belt 8 around the sheaves 31, 32. Thus, the pulley unit 3 is driven by the pulley unit 2 under control of V-belt 8 so that the gear unit 4 is driven under completion of the forward or reverse drive gear train to gradually accelerate the vehicle in the forward or reverse direction.

When the computer program proceeds to step 402 of the main control program during the acceleration of the vehicle, CPU calculates an electric current (i) on a basis of the function $i = f(Ne)$ from ROM in dependence upon the actual rotational speed (Ne) stored in RAM at the previous step 401. Upon completing this calculation, CPU produces a second output signal indicative of the calculated current (i) in response to which the clutch drive circuit 75 serves to produce a clutch drive signal indicative of the calculated current (i). Then, the coil 12 of powder clutch 1 is energized in response to the clutch drive signal from drive circuit 75 to decrease the difference in rotational speed between the members 11, 13 of powder clutch 1. Thus, an output torque from the engine is increasingly transferred by the powder clutch 1 to the pulley unit 2 to increase the actual rotational speed of pulley unit 2.

When the main control program proceeds to the step 403, CPU serves to calculate an output torque (T) of the engine from a function $T = f(Ne, \theta)$ in dependence upon the actual rotational speed (Ne) and throttle opening angle ($\theta$) which are respectively stored in RAM at the previous step 401. In the embodiment, the function $T = f(Ne, \theta)$ is experimentally determined and previously stored in ROM. Upon completing the calculation of the output torque (T), CPU calculates an effective radius ($r_{eff}$) of the V-belt 8 around the pulley unit 3 from a function $r_{eff} = f(Np/Ns)$ in dependence upon the actual rotational speeds (Np), (Ns) of pulley shafts 25, 37 stored in RAM at the previous step 401. The function $r_{eff} = f(Np/Ns)$ is experimentally determined in relation to the pulley units 2, 3 and previously stored in ROM. Thereafter, CPU serves to calculate an optimum fluid pressure (Pso) from a function $Pso = f(T/r_{eff})$ in dependence upon the calculated output torque (T) and effective radius ($r_{eff}$). In this stance, the calculated effective radius ($r_{eff}$) is smaller than the above-noted effective radius of the maximum value because of the acceleration of the vehicle.

Figure 3:
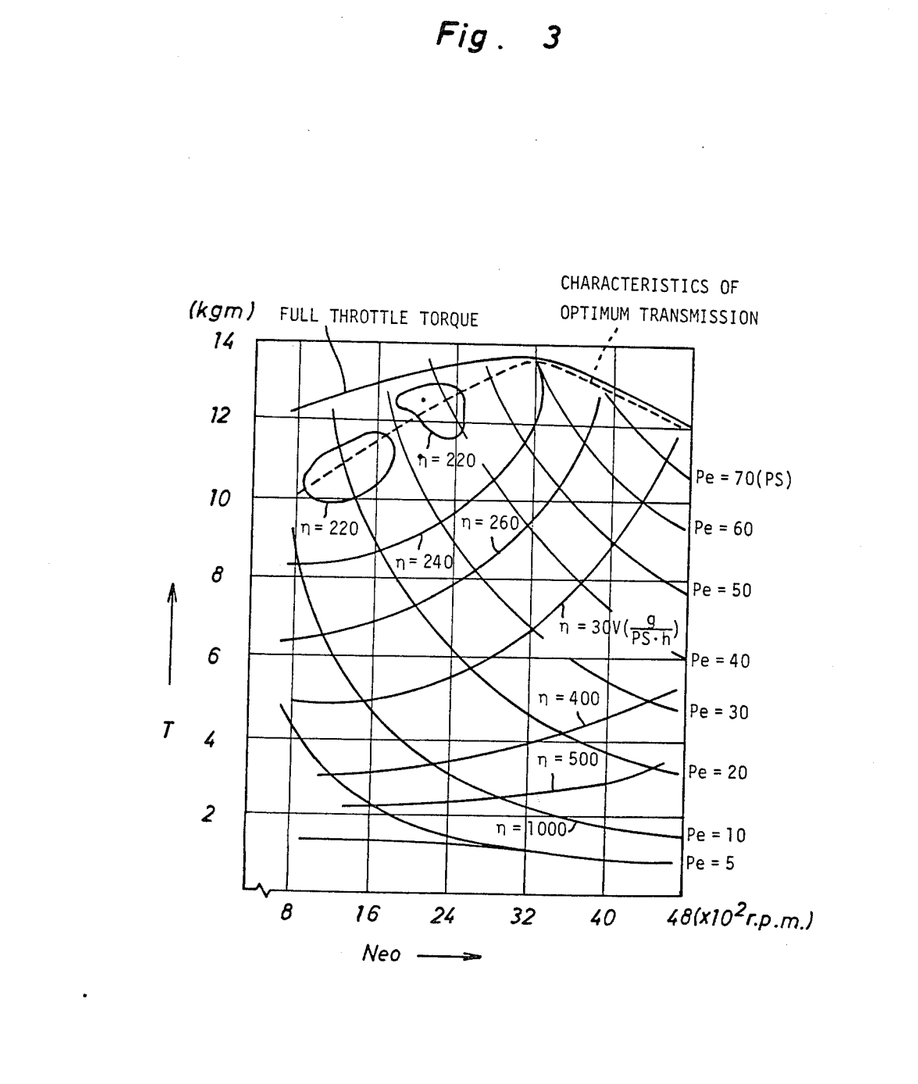
FIG. 3 is a graph indicating optimum transmission characteristics related to low fuel consumption ratio of an engine for the vehicle.

When the main control program proceeds to the step 404, CPU serves to calculate an output power (Pe) from a function $Pe = f(NeT)$ in dependence upon the calculated output torque (T) and the actual rotational speed (Ne) stored in RAM at the previous step 401. The function $Pe = f(NeT)$ is experimentally determined in relation to the performance of the engine and previously stored in ROM. Upon completing the calculation, CPU serves to determine an optimum rotational speed (Neo) of the engine on a basis of a function $Neo = f(Pe)$ in dependence upon the calculated output power (Pe). In the embodiment, the function $Neo = f(Pe)$ is defined by optimum transmission characteristics relative to low fuel consumption ratio of the engine, as shown by a dotted line in FIG. 3. This function $Neo = f(Pe)$ is previously stored in ROM in the form of a map. Additionally, in FIG. 3, h indicates hour, and $\eta$ indicates fuel consumption ratio related to the performance of the engine.

When the main control program proceeds to the step 405, CPU calculates an optimum transmission ratio (Ro) from a function $Ro = f(Neo/V)$ in dependence upon the calculated rotational speed (Neo) and the actual vehicle speed (V) stored in RAM at the previous step 401. Then, CPU also calculates the actual transmission ratio (R) from a function $R = f(Np/V)$ in dependence upon the actual speeds (Np), (V) stored in RAM at the step 401. In the embodiment, the function $Ro = f(Neo/V)$, $R = f(Np/V)$ are respectively determined experimentally and previously stored in ROM. With the proceedings of the main control program from the step 405 to the step 406, CPU calculates a desired fluid quantity ($Q_1$) from a function $Q_1 = f(Ro - R)$ in dependence upon the calculated transmission ratios (Ro), (R) and also calculates a desired fluid pressure ($Q_2$) from a function $Q_2 = f(Pso - Ps)$ in dependence upon the calculated fluid pressure (Pso) and the actual fluid pressure (Ps) stored in RAM at the step 401. The functions $Q_1 = f(Ro - R)$, $Q_2 = f(Pso - Ps)$ are respectively determined experimentally in consideration with relationship among the pulley units 2, 3 and the fluid control mechanism 5 and are stored previously in ROM.

Upon completing the calculations at step 406, CPU serves to produce third and fourth output signals indicative of the calculated fluid pressure and quantity ($Q_2$) and ($Q_1$) respectively. Then, the motor drive circuits 77 and 76 are responsive to the third and fourth output signals from CPU to produce motor drive signals indicative of the fluid pressure and quantity ($Q_2$) and ($Q_1$) respectively. When the servomotor 54 is driven in response to the motor drive signal from the drive circuit 77, the pressure control valve 52 is controlled to partly discharge the initial fluid pressure within the chamber 34 to the reservoir 9 through the conduits 104, 105 in such a manner to lower the same pressure by the calculated fluid one ($Q_2$). When the servomotor 53 is driven in response to the motor drive signal from the drive circuit 76, the flow control valve 51 is controlled to supply fluid of the line pressure from pump 61 to the fluid chamber 24 through the conduit 103 and passages 27, 26 in such a manner to supply the chamber 24 with the calculated fluid quantity ($Q_1$).

When the fluid chamber 24 is supplied with the fluid quantity ($Q_1$) and the lowered fluid pressure appears in the fluid chamber 34, as previously described, the conical sheave 22 of pulley unit 2 is axially moved leftward to axially move the conical sheave 32 of pulley unit 3 leftward due to the predetermined length of V-belt 8 so as to make the effective radius of V-belt 8 the calculated value ($r_{eff}$) around the pulley unit 3. Then, the V-belt 8 runs over the pulley unit 2 with a larger diameter and over the pulley unit 3 with a smaller diameter to increase the actual rotational speed of pulley shaft 37 with the transfer torque from pulley shaft 25. Thus, the actual rotational speed of gear unit 4 is increased to further accelerate the vehicle in the forward or reverse direction with the calculated optimum transmission ratio (Ro) defined by the low fuel consumption ratio of the engine.

When the actual rotational speed (Ne) of the engine exceeds 2000 r.p.m. during the above-noted repetitive execution, an electric current (i) is calculated as the maximum value ($i_m$) at step 402 by CPU from the function i=f(Ne), as previously described, and is produced from CPU as a second output signal indicative of the calculated current ($i_m$). Then, the coil 12 of clutch 1 is further energized under control of drive circuit 75 responsive to the second output signal from CPU to complete unitary rotation between the members 11, 13 of powder clutch 1. Thus, an output torque from the engine is transferred by the powder clutch 1 to the pulley unit 2 to rotate the same pulley unit 2 at the actual rotational speed (Ne) of the engine. When the main control program proceeds to step 403, the effective radius ($r_{eff}$) of V-belt 8 is calculated by CPU as one smaller than the previously calculated value to obtain an optimum fluid pressure (Pso) from the function Pso=f(T/$r_{eff}$), as previously described. Thereafter, CPU calculates an optimum rotational speed (Neo) of the engine at step 404 and also calculates an optimum transmission ratio (Ro) and the actual transmission ratio (R) at step 405, as previously described.

When the main control program proceeds to step 406, desired fluid pressure and quantity ($Q_2$) and ($Q_1$) are calculated by CPU in relation to the calculated values (Pso), (R), (Ro) and produced as third and fourth output signals respectively, as previously described. Then, the pressure control valve 52 is controlled under cooperation of the drive circuit 77 and servomotor 54 responsive to the third output signal from CPU to lower the actual fluid pressure within the chamber 34 by the newly calculated value ($Q_2$), and the flow control valve 51 is controlled under cooperation of the drive circuit 76 and servomotor 53 responsive to the fourth output signal from CPU to supply the fluid chamber 24 with the newly calculated fluid quantity ($Q_1$). Thus, the conical sheaves 22, 32 are respectively further moved to make the effective radius ($r_{eff}$) of V-belt 8 the newly calculated value. As a result, the actual diameter of V-belt 8 running over the pulley unit 2 is further increased to decrease the actual diameter of V-belt 8 running over the pulley unit 3. This results in further acceleration of the vehicle with the calculated optimum transmission ratio (Ro) defined by the low fuel consumption ratio of the engine.

When the actual rotational speed (Ne) of the engine is decreased to a value (>2000 r.p.m.) due to increase of vehicle loads during the above-noted repetitive execution, CPU calculates at step 403 the effective radius ($r_{eff}$) of V-belt 8 as one larger than the previously calculated value to obtain an optimum fluid pressure (Pso) from the function Pso=f(T/$r_{eff}$), as previously described. With the proceedings of the main control program to steps 404, 405, CPU calculates optimum rotational speed and transmission ratio (Neo), (Ro) and the actual transmission ratio (R) to obtain desired fluid pressure and quantity ($Q_2$) and ($Q_1$) at step 406, as previously described.

When the calculated fluid pressure and quantity ($Q_2$) and ($Q_1$) are produced from CPU as third and fourth output signals respectively, the pressure control valve 52 is controlled under cooperation of the drive circuit 77 and servomotor 54 responsive to the third output signal from CPU to increase the actual fluid pressure within the chamber 34 by the newly calculated value ($Q_2$), and the flow control valve 51 is controlled under cooperation of the drive circuit 76 and servomotor 53 responsive to the fourth output signal from CPU to decrease the actual fluid quantity within the chamber 24 by the newly calculated value ($Q_1$). Thus, the conical sheaves 22, 32 are respectively moved rightward to make the effective radius ($r_{eff}$) of V-belt 8 the newly calculated value. As a result, the actual diameter of V-belt 8 running over the pulley unit 2 is decreased to increase the actual diameter of V-belt 8 running over the pulley unit 3. This decelerates the vehicle with the calculated optimum transmission ratio (Ro) defined by the low fuel consumption ratio of the engine.

In case the vehicle is travelled at a constant speed during the above operation, fluid quantity and pressure within the chambers 24 and 34 are substantially maintained unchangeable by the control valves 51 and 52 under control of the flow divider valves 106 and 107 respectively. Thus, CPU is responsive to the constant vehicle speed stored in RAM to cease generation of the first output signal therefrom so that the electric motor 62 is stopped to prevent unnecessary electric power loss of the vehicle battery 10.

Although in the above embodiment the pressure sensor 205 is disposed within the conduit 104, it may be disposed within the conduit 103, as shown by a dot-dash line of FIG. 1, to detect the actual fluid pressure in the chamber 24. In this modification, the flow control valve 51 is used as a pressure control valve, and the pressure control valve 52 is used as a flow control valve. The main control program is also modified to calculate an effective radius of V-belt 8 around the pulley unit 2 and to calculate desired fluid quantity and pressure ($Q_1$) and ($Q_2$) such that third and fourth output signals indicative of the calculated fluid pressure and quantity ($Q_2$) and ($Q_1$) are applied to the motor drive circuits 76 and 77 respectively. In this case, the main control program may be modified to calculate the actual vehicle speed (V) from the actual rotational speed (Ne) stored in RAM so as to eliminate the speed sensor 202.

While in the above embodiment each of the servomotors 53, 54 is constructed by the rack-and-pinion and the electric pulse motor, it may be also constructed by an electrically operated linear solenoid to control each of the control valves 51, 52.

Although in the above embodiment the function i=f(Ne) is represented by the above-noted relationship that the electric current (i) is substantially proportional to the actual rotational speed (Ne) or takes the constant ($i_m$) in spite of change of the actual rotational speed (Ne), it may be also modified as another desired relationship of the current (i) with the rotational speed (Ne) in necessity to attain smooth acceleration of the vehicle. In thid case, the powder clutch 1 may be replaced with a hydraulically operated automatic-clutch which is controlled under operation of an electrically operated control valve by the microcomputer 74 in the similar manner to control of powder clutch 1.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an electric control system for an automobile transmission comprising a driving pulley unit of the V-shaped type provided with a drive shaft drivingly connected to an output shaft of an internal combustion engine for a vehicle, and with a pair of facing, conical sheaves, assembled for rotation about said drive shaft, a driven pulley unit of the V-shaped type provided with a driven shaft and a pair of facing, conical sheaves, assembled for rotation about said driven shaft, an endless transmission member wound around said pulley units for transmitting an output torque from said engine to said driven shaft with an infinitely variable transmission ratio under control of each mutual distance of said conical sheaves of said respective pulley units, and first and second actuators associated with each of said pulley units for adjusting the distances between said respective conical sheaves thereof under control of fluid under pressure applied thereto, the improvement comprising:

means for determining an optimum fluid pressure in relation to the actual output torque of said engine and the actual transmission ratio between said pulley units;

means for determining an optimum rotational speed of said engine for low fuel consumption in relation to the actual output power of said engine and determining an optimum transmission ratio related to said optimum rotational speed of said engine;

means for producing a first electric control signal indicative of the difference between said optimum fluid pressure and the actual fluid pressure in one of said actuators and producing a second electric control signal indicative of the difference between said optimum transmission ratio and the actual transmission ratio; and an electrically operated fluid control means responsive to said first and second electric control signals to control the pressure of fluid applied to one of said actuators and to control the flow quantity of fluid applied to the other actuator.

2. An electric control system for an automobile transmission as claimed in claim 1, wherein said means for determining an optimum fluid pressure in relation to the actual output torque of said engine and the actual transmission ratio comprises:

first sensing means for producing a first electric signal indicative of the actual rotational speed of said engine;

second sensing means for producing a second electric signal indicative of the actual opening angle of a throttle valve of said engine;

third sensing means for producing a third electric signal indicative of the actual rotational speed of said drive shaft;

fourth sensing means for producing a fourth electric signal indicative of the actual rotational speed of said driven shaft; and means for calculating an output torque of said engine in dependence upon each value of said first and second electric signals from a function $T=f(Ne, \theta)$ describing the output torque T in relation to the actual rotational speed Ne of said engine and the actual opening angle $\theta$ of said throttle valve, for calculating an effective radius of said endless transmission member around one of said pulley units in dependence upon each value of said third and fourth electric signals from a function $r_{eff}=f(Np/Ns)$ describing the effective radius $r_{eff}$ in relation to the actual rotational speeds $N_p$, $N_s$ of said drive and driven shafts, and for determining said optimum fluid pressure in dependence upon the calculated output torque T and the effective radius $r_{eff}$.

3. An electric control system for an automobile transmission as claimed in claim 2, wherein said means for determining an optimum rotational speed of said engine for low fuel consumption comprises:

fifth sensing means for producing a fifth electric signal indicative of the actual speed of said vehicle; and means for calculating an output power of said engine in dependence upon a value of said first electric signal and the calculated output torque T from a function $Pe=f(NeT)$ describing the output power Pe in relation to the actual rotational speed Ne of said engine and the calculated output torque T, for calculating said optimum rotational speed Neo of said engine in relation to the calculated output power Pe from a function $Neo=f(Pe)$, and for calculating said optimum transmission ratio in dependence upon the calculated optimum rotational speed Neo and a value of said fifth electric signal from a function $Ro=f(Neo/V)$ describing the optimum transmission ratio Ro in relation to the calculated optimum rotational speed Neo and the actual speed of said vehicle.

4. An electric control system for an automobile transmission as claimed in claim 3, wherein said means for producing said first and second electric control signals comprises:

sixth sensing means for producing a sixth electric signal indicative of the actual pressure of fluid applied to one of said actuators; and means for producing said first electric control signal indicative of the difference between values of said optimum fluid pressure and said sixth electric signal and for producing said second electric control signal indicative of the difference between the calculated optimum transmission ratio and the actual ratio of the value of said third electric signal to the value of said fourth electric signal.

5. An electric control system for an automobile transmission as claimed in claim 1, wherein said electrically operated fluid control means comprises:

a pressure control valve associated with an electric servomotor responsive to said first control signal for controlling the pressure of fluid applied to one of said actuators from a source of fluid under pressure; and a flow control valve associated with an electric servomotor responsive to said second control signal for controlling the flow quantity of fluid applied to the other actuator from said source of fluid under pressure.

6. An electric control system for an automobile transmission as claimed in claim 2, further comprising:

an electromagnetic powder clutch having an input member connected to the output shaft of said engine and an output member connected to the drive shaft of said driving pulley unit;

means for calculating an electric current in relation to a value of said first electric signal from a function $i=f(Ne)$ describing a relationship between the electric current i and the actual rotational speed of said engine and for producing a third electric control signal indicative of a value of the calculated electric current i; and a drive circuit responsive to said third electric control signal to apply the calculated electric current to said powder clutch.

* * * * *